United States Patent [19]

Imai et al.

[11] 3,714,279
[45] Jan. 30, 1973

[54] PROCESS FOR THE PRODUCTION OF 5-ALKYLIDENENORBORNENE-2

[75] Inventors: Hirosuke Imai, Yokohama; Takeo Koizumi, Kawasaki-shi, both of Japan

[73] Assignee: Nippon Oil Company Limited, Tokyo, Japan

[22] Filed: Nov. 4, 1971

[21] Appl. No.: 195,834

[30] Foreign Application Priority Data

Nov. 6, 1970 Japan..................45/97629

[52] U.S. Cl............................................260/666 PY
[51] Int. Cl................................................C07c 5/28
[58] Field of Search................................260/666 PY

[56] References Cited

UNITED STATES PATENTS

| 3,471,581 | 10/1969 | Maxfield | 260/666 A |
| 3,671,597 | 6/1972 | Kroll | 260/666 PY |
| 3,586,726 | 6/1971 | Atkins et al. | 260/666 A |

*Primary Examiner*—Curtis R. Davis
*Assistant Examiner*—Veronica O'Keefe
*Attorney*—Ralph E. Buchnam et al.

[57] ABSTRACT

A process is disclosed for the preparation of 5-alkylidenenorbornene-2 for use as an important component of EPDM rubber. This product is obtained by the isomerization of 5-alkenylnorbornene-2 which is carried out in the presence of a composite catalyst having increased activity and tending to suppress the formation of undesirable side products. The composite catalyst is essentially comprised of a cyclopentadienyl cobalt compound, an organometallic compound and an activating agent, and has been found peculiarly effective in the isomerization reaction.

7 Claims, No Drawings

PROCESS FOR THE PRODUCTION OF 5-ALKYLIDENENORBORNENE-2

This invention relates to a process for the preparation of 5-alkylidenenorbornene-2, and more specifically to a process for preparing 5-alkylidenenorbornene-2 by rearranging 5-alkenylnorbornene-2.

Recently, a copolymer of ethylene, propylene and non-conjugated diolefins commonly known as EPDM has invited keen attention in the art for its excellent weather-proofing, ozone-resistant and heat-resistant properties. However, the EPDM polymers have the drawback that their vulcanization rate is inferior to that of widely used rubbers such as natural rubber, SBR and polybutadiene rubber. Moreover, EPDM is difficult to covulcanize with these rubbers. It has been later found that the problems of vulcanization inherent in the EPDM copolymers can be solved to a satisfactory extent by employing, as the non-conjugated diolefin, certain 5-alkylidenenorbornene-2 such as for example 5-ethylidenenorbornene-2 in the preparation of the EPDM copolymers.

Heretofore, various processes have been introduced for the preparation of 5-alkylidenenorbornene-2, but there were no definite processes established for producing this material economically on a commercial scale at least to an extent to make the EPDM process economically feasible.

Known processes for preparing 5-alkylidenenorbornene-2 as the third component of EPDM copolymers include:

i. The Diels-Alder reaction of alkylallene with cyclopentadiene.
ii. The isomerization of 1-alkylnorbornadiene-2,5 produced by the Diels-Alder reaction of acetylene with alkylcyclopentadiene.
iii. The isomerization of 5-alkenylnorbornene-2 produced by the Diels-Alder reaction of diolefin with cyclopentadiene.

The processes i) and ii) are disadvantageous in that the materials, viz. alkylallene and alkylcyclopentadiene, are relatively expensive. The process iii) involves difficulties in carrying out the isomerization reaction.

Various processes are known for isomerizing 5-alkenyl-norbornene-2 to 5-alkylidenenorborne-2. A typical example is disclosed by U.S. Pat. No. 3,347,944 wherein the reaction is carried out in the presence of certain alkalimetal/carrier catalysts and also wherein the reaction employs strong bases such as t-butoxy potassium and potassium hydroxide in dimethyl sulfoxide, or sodium amide in a nitrogen-containing solvent such as liquid ammonia.

Another prior-art process is taught by French Pat. No. 1,556,198 in which the isomerization is carried out by the use of catalysts comprised of organometallic compounds as combined with inorganic salts of divalent or trivalent cobalt such as cobalt chloride, or with organic salts of cobalt such as cobalt acetylacetonate and cobalt naphthenate.

The above-examplified prior-art isomerization processes involve a number of problems; namely, (a) the catalyst activity is poor and hence, considerable amounts of catalysts are required to achieve a reasonable yield of 5-alkylidene-norbornene-2, (b) the isomerization rate is slow, entailing a side-production of tetrahydroindene, and (c) large quantities of expensive solvents such as dimethylsulfoxide are required. These problems have made it difficult to produce with reasonable economy the desired 5-alkylidene-norbornene-2 by rearranging 5-alkenylnorbornene-2.

Whereas, it is an object of the present invention to provide a process for the preparation of 5-alkylidenenorbornene-2 which will eliminate the above-noted difficulties of the prior-art processes.

A more specific object of the invention is the provision of an improved process wherein 5-alkenylnorbornene-2 is isomerized to 5-alkylidenenorbornene-2 with use of a minimum of catalysts, at increased reaction rate and without entailing a side-production of objectionable materials such as tetrahydroindene and polymers.

Other features and advantages of the invention will appear clear from the detail description given hereinafter and from the appended claims.

According to the invention, there is provided a process which essentially comprises isomerizing 5-alkenylnorbornene-2 to 5-alkylidenenorbornene-2 in contact with a composite catalyst comprised of:

a. a cyclopentadienyl cobalt compound
b. an organometallic compound selected from metals of Groups I, II and III of the Periodic Table, and
c. an activating agent selected from the group consisting of oxygen, phosphine and its derivatives, and organic peroxides.

The term 5-alkenylnorbornene-2 used herein represents a compound having the general formula;

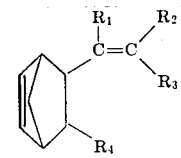

where $R_1$, $R_2$, $R_3$ and $R_4$ are hydrogen, methyl or ethyl radical, typical examples of which are 5-vinylnorbornene-2, 5-isopropenylnorbornene-2, 5-vinyl-6-methyl-norbornene-2 and the like.

The reaction of isomerizing 5-alkenylnorbornene-2 to 5-alkylidenenorbornene-2 may be represented by the following formula:

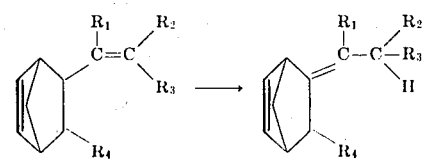

5-alkylidenenorbornene-2 exists in cis and trans isomeric forms but there is no appreciable difference therebetween when it is used as the third component in the production of EPDM rubber.

The catalyst employed in the process of the invention is a combination of (a) a cyclopentadienyl cobalt compound, (b) an organometallic compound and (c) an activating agent.

By the term cyclopentadienyl cobalt compound is meant a compound consisting of cobalt to which a cyclopentadienyl radical is pi-bonded, which compound may be represented by the following general formulas;

$$(R - C_5H_4)_2 Co \qquad (1)$$

where R is hydrogen, or a hydrocarbon radical such as methyl, ethyl and the like. This compound is a biscyclopentadienyl cobalt derivative, illustrative examples of which include biscyclopentadienyl cobalt (cobaltcene), bismethylcyclo-pentadienyl cobalt and bisindenyl cobalt.

$$(R - C_5H_4)_n CoX_{3-n} \qquad (2)$$

where R is as defined above; X is halogen atom such as chlorine and bromine; and n is an integer having a value of 1 or 2. This is a biscyclopentadienyl cobalt halogenide compound such as for example, biscyclopentadienyl cobalt chloride, bismethylcyclopentadienyl cobalt chloride, and bisindenyl cobalt chloride.

$$(R - C_5H_4)CoR' \qquad (3)$$

where R is as defined above; and R' is cyclopentadiene, indene and their derivatives. This is a cyclopentadienyl cyclopentadiene cobalt compound such as for example, cyclopentadienyl cyclopentadiene cobalt, methylcyclopentadienyl methylcyclopentadiene cobalt and indenyl indene cobalt.

By the phrase organometallic compound selected from metals of Groups I, II and III of the Periodic Table is meant a compound which is represented by the general formula:

$$Me(R)_n, \text{ or}$$

$$Me(R)_n (R')_m$$

where Me is a metal of the Groups I, II and III of the Periodic Table; R is hydrogen atom, alkyl, cycloalkyl or aryl radical; R' is hydrogen atom, halogen, alkyl, cycloalkyl, aryl, alkoxy or amino radical; n is an integer of 3 or lower value; and n+m is a valence of a given metal. Typical examples of these organometallic compounds include butyl sodium, phenyl potassium, benzyl sodium, butyl lithium, diethyl magnesium, diethyl cadmium, diethyl zinc, triethyl aluminum, triisobutyl aluminum, diethyl aluminum, ethyl diethoxy aluminum, and products resulting from the reaction of triethyl aluminum and dimethyl ethanol amine. In the practice of the invention, two or more mixtures of these organometallic compounds such as lithium aluminum hydride may also be used.

By the term activating agent is meant the following categories of materials:

1. Oxygen and oxygen-containing inert gases.
2. Phosphine and its derivatives, illustrative examples include:
2a. trialkyl phosphine such as triethyl phosphine and tributyl phosphine, or triaryl phosphine such as triphenyl phosphine;
2b. trialkyl phosphine oxide such as tributyl phosphine oxide or triaryl phosphine oxide such as triphenyl phosphine oxide;
2c. trialkyl phosphate such as tributyl phosphate, or triaryl phosphate such as triphenyl phosphate; and
2d. trialkyl phosphite such as tributyl phosphite, or triaryl phosphite such as triphenyl phosphite.
3. Organic peroxides such as hydrogen peroxide, benzoyl peroxide, dicumyl peroxide and butyl hydroperoxide.

The cyclopentadienyl cobalt compounds per se are capable of isomerizing 5-alkenylnorbornene-2 to some small extent as indicated in the comparative examples hereinafter given. Their catalytic activity has now been found to increase considerably when these cobalt compounds are combined with the above-exemplified organometallic compounds and activating agents. It has also been found that these composite catalysts according to the invention are not only highly active in the isomerization of 5-alkenylnorbornene-2, but also serve to inhibit the tendency of objectionable tetrahydroindene derivatives being produced during the reaction.

The amount of cyclopentadienyl cobalt compound to be added to starting 5-alkenylnorbornene-2 is of the order of 0.0001 to 0.05 mol per mol of the latter according to the invention.

The amount of the organometallic compound to be added with the cyclopentadienyl cobalt compound is not critically limited, but may be of the order of 0.5 to 10 mols, preferably 2 to 5 mols per mol of the latter. Excessive amounts are literally economically disadvantageous. Similarly, the activating agent has no critical limitations as to its amount relative to the cyclopentadienyl cobalt compound, and may be of the order of generally 0.25 to 4 mols, preferably 0.5 to 2 mols per mol of the latter. Less activator would lead to decreased catalytic activity, and more activator is not only economically disadvantageous but would tend to hold back the desired activity of the catalyst.

It has been experimentally found that the catalytic activity is largely dependent upon how the catalyst has been prepared. One way of preparing a catalyst suitable for the purpose of the invention is to admix the cyclopentadienyl cobalt compound first with the organometallic compound and then the activating agent is added to these mixtures. Alternatively, the cyclopentadienyl cobalt compound is admixed first with the activating agent, followed by addition of the organometallic compound. If the activating agent has been initially reacted with the organometallic compound before these two components are added to the cyclopentadienyl cobalt compound, the resulting catalyst would become extremely poor in its activity in the isomerization reaction as shown by the comparative examples hereinafter presented. According to the invention catalysts are prepared in the solvents which are free of adverse effect upon the reaction, for example aliphatic or aromatic hydrocarbon solvents. The presence of 5-alkenylnorbornene-2 in the solvents has no substantial bearing upon the catalytic activity. Although it is not critically limited, the temperature for catalyst preparation may be preferably in the range of −78° to 100° C.

The catalytic isomerization of 5-alkenylnorbornene-2 according to the invention may be carried out with use of certain organic solvents which do not deleteriously affect the reaction, examples of which solvents are aliphatic or aromatic hydrocarbons. The process of the invention is advantageous in that it precludes the necessity of such expensive solvents as dimethylsulfoxide and hexamethylphosphor amide which have been employed in conventional isomerization processes.

The isomerization reaction according to the invention is carried out at temperatures ranging between 80° C and 200° C, preferably between 120° C and 200° C, and with or without pressure. These isomerization reactions may be carried out continuously or batchwise.

Unreacted 5-alkenylnorbornene-2 may be separated by distillation from 5-alkylidenenorbornene-2 and may be used again for the isomerization.

The process of the invention will be further described by the following examples which are presented by way of illustration and not of limitation.

EXAMPLES I – IV

These examples are given in respect of the isomerization of 5-vinylnorbornene-2 in the presence of a catalyst comprised of cobaltcene, triisobutyl aluminum and oxygen.

Catalyst Preparation
Procedure (I)

To a nitrogen-purged 300 milliliter flask were charged 0.01 mol refined cobaltcene and 100 milliliters toluene. This mixture was cooled with water to room temperature, followed by addition of 80 milliliters toluene solution of triisobutyl aluminum (0.5 mol/liter). The reaction was continued with stirring for 10 minutes. To this reaction mixture was injected a predetermined amount of refined oxygen from a gas burette. The whole was stirred for 30 minutes. was reversed; that is, oxygen was added to the cobaltcene solution in advance to triisobutyl aluminum.

Procedure (III)

The procedure (I) was followed except that triisobutyl aluminum and oxygen had been initially reacted before they were added to the cobaltcene solution.

Isomerization Reaction

To a nitrogen-purged, 200 milliliter stainless steel autoclave were charged 0.5 mol 5-vinylnorbornene-2 and the catalyst solution (cobalt: 2 milligram atoms) which had been prepared as above. The reaction was continued with stirring at 150° C for 2 hours. The reaction mixture was analyzed by gas chromatography, and the results of this analysis are summarized in Table 1 below. The comparative examples are given in this table wherein the isomerization reaction was conducted with a catalyst comprising in one instance cobaltcene alone, in another instance cobaltcene with either triisobutyl aluminum or oxygen and in a further instance the catalyst which had been prepared by procedure (III).

In Comparative Example 2, triisobutyl aluminum alone was reacted with cobaltcene according to Procedure (I), and in Comparative Example 3, oxygen alone was reacted with cobaltcene also according to Procedure (I). It will be noted from Comparative Example 1 that different from ordinary cobalt compounds, cobaltcene per se has some catalytic activity in the isomerization of 5-vinylnorbornene-2. When cobaltcene is added with triisobutyl aluminum or oxygen, its activity is somewhat increased as seen in Comparative Examples 2 and 3. However, for the same amounts of cobaltcene used, it is possible to obtain yields far greater with use of the composite catalysts as in working Examples 1–4 than with those in Comparative Examples. This is because, as previously discussed, the composite catalysts prepared either by Procedure (I) or (II) according to the invention possess peculiar catalytic activity in the isomerization of 5-alkenylnorbornene-2. This is evidenced by the use of a relatively small quantity of the catalyst of the invention; that is, only 0.4 mol percent of cobaltcene is required to obtain a high yield (82.4 percent) of the desired 5-ethylidenenorbornene-2. The composite catalysts according to the invention have also proven effective in suppressing the tendency of side-production of tetrahydroindene.

Comparative Example 4 may be noted with interest for the very low yield of product and increased by-products such us addition tetrahydroindene in spite of the fact that a catalyst of the same composition as those in the working Examples was used. This is due to Procedure (III) contrary to this invention, wherein triisobutyl aluminum had been previously reacted with oxygen prior to their additions to cobaltcene.

EXAMPLES V — VII

These examples are given in respect of the isomerization of 5-vinylnorbornene-2 in which various cyclopentadienyl cobalt compounds were attempted for combination with triethyl aluminum and oxygen to form a composite catalyst according to the invention. Procedure (I) in example I was followed in preparing the catalysts except that different cyclopentadienyl cobalt compounds were employed. The isomerization was conducted in a nitrogen-purged, 200 milliliter stainless steel autoclave to which 0.5 mol refined 5-vinylnorbornene-2 and a catalyst solution (cobalt: 4 milligram atoms) were charged. The reaction was continued with stirring at 170° C for 1 hour. The reaction mixture was analyzed by gas chromatography, and the

TABLE 1

| | Catalyst system | | | | Unreacted vinyl-norbornene-2 | Reaction product | |
|---|---|---|---|---|---|---|---|
| | $Co(C_5H_5)$ (mmol) | $Al(iBu)_3$ (mmol) | $O_2$ (mmol) | Procedure | | ENB* (percent) | THI** (percent) |
| Comparative Example: | | | | | | | |
| 1 | 2 | 0 | 0 | | 95.6 | 1.3 | 3.1 |
| 2 | 2 | 8 | 0 | | 83.1 | 14.4 | 2.5 |
| 3 | 2 | 0 | 2.5 | | 91.0 | 6.1 | 2.9 |
| Example: | | | | | | | |
| 1 | 2 | 8 | 2.5 | (I) | 16.6 | 82.4 | 0.9 |
| 2 | 2 | 8 | 3 | (I) | 24.9 | 74.1 | 1.0 |
| 3 | 2 | 8 | 2.5 | (II) | 28.8 | 70.6 | 0.7 |
| 4 | 2 | 8 | 3 | (II) | 43.9 | 55.3 | 0.8 |
| Comparative Example 4 | 2 | 8 | 2.5 | (III) | 80.2 | 16.9 | 2.5 |

*ENB denotes 5-ethylidenenorbornene-2.
**THI denotes tetrahydroindene.

results of this analysis are shown in the following table.

TABLE 2

| Example | Catalyst system | | | Unreacted vinyl-norbornene-2 (percent) | Reaction product | |
|---|---|---|---|---|---|---|
| | Cyclopentadienyl cobalt compounds (mmol) | AlEt₃ (mmol) | O₂ (mmol) | | ENB (percent) | THI (percent) |
| 5 | Co(C₅H₄CH₃)₂ | 4 | 16 | 5 | 10.0 | 89.2 | 0.8 |
| 6 | Co(C₅H₅)₂Cl | 4 | 16 | 5 | 40.8 | 58.3 | 0.9 |
| 7 | Co(C₅H₅)(C₅H₆) | 4 | 16 | 5 | 27.9 | 71.2 | 0.9 |

EXAMPLES VIII–XI

These examples are given in respect of the isomerization of 5-vinylnorbornene-2 in which cobaltcene was activated by different kinds of organometallic compounds (shown in Table 3) and in contact with dry air equivalent to the specified amount of oxygen. The catalysts were prepared by Procedure (I) of Example I. There was used n-heptane as a solvent. The isomerization was conducted in a nitrogen-purged, 200 milliliter stainless steel autoclave to which 0.5 mol of 5-vinylnorbornene-2 and a catalyst solution (cobalt: 5 milligram atoms) were charged. The reaction was continued with stirring at 130° C for 2 hours. The reaction mixture was analyzed by gas chromatography to reveal the results tabulated below.

TABLE 3

| Example | Catalyst system | | | Unreacted vinyl-norbornene-2 (percent) | Reaction product | |
|---|---|---|---|---|---|---|
| | Co(C₅H₅)₂ (mmol) | Organometallic compounds (mmol) | O₂ (mmol) | | ENB (percent) | THI (percent) |
| 8 | 5 | Diethylethoxy aluminum 30 | 6 | 20.5 | 78.8 | 0.7 |
| 9 | 5 | Al(C₂H₅)₂(OCH₂CH₂N(CH₃)₂) 20 | 6 | 38.2 | 61.3 | 0.5 |
| 10 | 5 | Diethyl zinc 10 | 6 | 66.4 | 33.1 | 0.5 |
| 11 | 5 | Phenyl sodium 20 | 6 | 62.1 | 37.4 | 0.5 |

EXAMPLES XII–XIX

A catalyst comprised of cobaltcene and tri-n-butyl aluminum was activated by the various activating agents (shown in Table 4). Procedure (I) in Example I was followed for catalyst preparation. The solvent was p-xylene. The isomerization was conducted in a nitrogen-purged, 200 milliliter stainless steel autoclave to which 0.5 mol 5-vinylnorbornene-2 and a catalyst solution (cobalt: 2 milligram atoms) were charged. The reaction was continued with stirring at 150° C for 2 hours. Gas chromatography was employed for the analysis of the reaction product. The results of this analysis are summarized in the following table.

TABLE 4

| Example | Catalyst system | | | Unreacted vinyl-norbornene-2 (percent) | Reaction product | |
|---|---|---|---|---|---|---|
| | Co(C₅H₅)₂ (mmol) | Al(n-Bu)₃ (mmol) | Activator (mmol) | | ENB (percent) | THI (percent) |
| 12 | 2 | 8 | Triphenyl phosphine 1 | 19.1 | 79.3 | 1.6 |
| 13 | 2 | 8 | Triphenyl phosphine oxide 1 | 42.3 | 53.7 | 4.0 |
| 14 | 2 | 8 | Tri-n-butyl phosphine 1 | 31.2 | 67.6 | 1.2 |
| 15 | 2 | 8 | Tri-n-butoxy phosphine 1 | 52.4 | 46.3 | 1.3 |
| 16 | 2 | 8 | Triphenoxy phosphine oxide 1 | 34.4 | 64.4 | 1.2 |
| 17 | 2 | 8 | Benzoyl peroxide 1 | 46.1 | 52.2 | 1.7 |
| 18 | 2 | 8 | Dicumyl peroxide 1 | 31.4 | 67.1 | 1.5 |
| 19 | 2 | 8 | Butyl hydroperoxide 1 | 41.8 | 56.6 | 1.6 |

EXAMPLE XX

This example is directed to the isomerization of 5-propenylnorbornene-2 in contact with a catalyst system containing bisindenyl cobalt in lieu of cobaltcene. To a nitrogen-purged, 100 milliliter stainless steel autoclave were charged 0.25 mol of 5-propenylnorbornene-2 and a catalyst solution (cobalt: 2 milligram atoms). The reaction was continued with stirring at 170° C for 2 hours. The reaction product was analyzed by gas chromatography thereby revealing a yield of 81.3 percent 5-propylidenenorbornene-2.

What is claimed is:

1. A process for the production of 5-alkylidene-norbornene-2 which comprises isomerizing 5-alkenylnorbornene-2 in contact with a composite catalyst comprising:

a. a cyclopentadienyl cobalt compound of either of the general formulas $$(R-C_5H_4)_2Co \quad (1)$$

where R is hydrogen, or a hydrocarbon radical such as methyl, ethyl and the like, $$(R-C_5H_4)_n CoX_{3-n} \quad (2)$$

where R is hydrogen, or hydrocarbon radical such as methyl, ethyl and the like; X is halogen atom such as chlorine and bromine; and n is an interger having a value of 1 or 2, $$(R-C_5H_4)CoR' \quad (3)$$

where R is hydrogen, or hydrocarbon radical such as methyl, ethyl and the like; and R' is cyclopentadiene, indene and their derivatives, b. an organometallic compound of the general formula $$Me(R)_n, \text{ or}$$

$$Me(R)_n(R')_m$$

where Me is a metal of the Groups I, II and III of the Periodic Table; R is hydrogen atom, alkyl, cycloalkyl or aryl radical; R' is hydrogen atom, halogen, alkyl, cycloalkyl, aryl, alkoxy or amino radical; $n$ is an integer 3 or lower value; and $n+m$ is a valence of a given metal, and c. an activating agent selected from the group consisting of oxygen and oxygen-containing gases, phosphine and its derivatives, and organic peroxides.

2. The process as claimed in claim 1 wherein the isomerization reaction is carried out at temperatures ranging between 80° and 200° C.

3. The process as claimed in claim 1 wherein said composite catalyst is prepared by reacting said cyclopentadienyl cobalt compound with said organometallic compound in advance to the addition of said activating agent.

4. The process as claimed in claim 3 wherein said cyclopentadienyl cobalt compound is activated by said activating agent in advance to the addition of said organometallic compound.

5. The process as claimed in claim 1 wherein the amount of cyclopentadienyl cobalt compound to be added to starting 5-alkenylnorbornene-2 is of the order of 0.0001 to 0.05 mol per mol of the latter.

6. The process as claimed in claim 1 wherein the amount of said organometallic compound to be added to said cyclopentadienyl cobalt compound is of the order of 0.5 to 10 mol per mol of the latter.

7. The process as claimed in claim 1 wherein the amount of said activating agent to be added to said cyclopentadienyl cobalt compound is of the order of 0.25 to 4 mol per mol of the latter.

\* \* \* \* \*